(12) United States Patent
Dewan

(10) Patent No.: US 11,170,184 B2
(45) Date of Patent: Nov. 9, 2021

(54) COMPUTER IMPLEMENTED SYSTEM AND METHOD FOR AUTOMATICALLY GENERATING MESSAGES

(71) Applicant: Mohan Dewan, Maharashtra (IN)

(72) Inventor: Mohan Dewan, Maharashtra (IN)

( * ) Notice: Subject to any disclaimer, the term of this patent is extended or adjusted under 35 U.S.C. 154(b) by 148 days.

(21) Appl. No.: 16/488,422

(22) PCT Filed: May 26, 2018

(86) PCT No.: PCT/IB2018/053761
§ 371 (c)(1),
(2) Date: Aug. 23, 2019

(87) PCT Pub. No.: WO2018/220499
PCT Pub. Date: Dec. 6, 2018

(65) Prior Publication Data
US 2020/0065391 A1 Feb. 27, 2020

(30) Foreign Application Priority Data
May 27, 2017 (IN) .............................. 201721018701

(51) Int. Cl.
*G06F 40/56* (2020.01)
*G06F 40/284* (2020.01)
*G06F 40/205* (2020.01)
*G06N 3/02* (2006.01)
*H04L 12/58* (2006.01)

(52) U.S. Cl.
CPC ............ *G06F 40/56* (2020.01); *G06F 40/205* (2020.01); *G06F 40/284* (2020.01); *G06N 3/02* (2013.01); *H04L 51/02* (2013.01)

(58) Field of Classification Search
None
See application file for complete search history.

(56) References Cited

U.S. PATENT DOCUMENTS

| 8,082,151 | B2 | 12/2011 | Bangalore | |
|---|---|---|---|---|
| 10,027,615 | B2* | 7/2018 | Liu | ........... H04L 51/16 |
| 2009/0076795 | A1* | 3/2009 | Bangalore | ............... G06F 40/30 704/9 |
| 2016/0330156 | A1* | 11/2016 | Dunne | ..................... H04L 51/04 |
| 2016/0352656 | A1* | 12/2016 | Galley | .................. G06N 3/0454 |
| 2017/0178048 | A1* | 6/2017 | Ghotbi | .................... G06N 3/006 |

* cited by examiner

*Primary Examiner* — Richa Mishra
(74) *Attorney, Agent, or Firm* — Blueshift IP, LLC; Robert Plotkin

(57) ABSTRACT

The present disclosure relates to a computer implemented system and method for automatically generating messages. A repository (102) stores information related to chat sessions corresponding to a set of recipients, the information including contents of chats, historical timestamp information, personal information corresponding to each of the recipients, and relationship details of each recipient with a user. A parser (104) parses information to generate parsed data including verbs, nouns and common phrases. An analyzer (106) analyzes the stored information to extract behavioral data of the user. A searching module (108) searches and extracts relevant data from the web based on the parsed data. A message generator (110) generates messages corresponding to each recipient.

7 Claims, 2 Drawing Sheets

COMPUTER IMPLEMENTED SYSTEM AND METHOD FOR AUTOMATICALLY GENERATING MESSAGES

FIELD

The present disclosure relates to messaging systems.

Definition

The expression 'chat session' used in the context of this disclosure refers to, but is not limited to, an interactional dialog between individuals.

The expression 'fuzzy logic' used in the context of this disclosure refers to, but is not limited to, a form of a valued logic in which the truth values of variables may be any real number between 0 and 1.

The expression 'artificial neural network (ANN)' used in the context of this disclosure refers to, but is not limited to, a computational model used in machine learning, computer science and other research disciplines, which is based on a large collection of connected simple units called artificial neurons, loosely analogous to axons in a biological brain.

The expression 'syntactic analysis' used in the context of this disclosure refers to, but is not limited to, a process of analysing a string of symbols conforming to the rules of formal grammar.

The expression 'semantic analysis' used in the context of this disclosure refers to, but is not limited to, a process of analyzing syntactic structures, from the levels of phrases, clauses, sentences and paragraphs to the level of the writing as a whole, to their language-independent meanings.

The expression 'Live feed' used in the context of this disclosure refers to, but is not limited to, a platform that provides a place to post and share content on any social media websites. This content forms a searchable knowledge source for sharing information. Users can post, reply to, and rate messages.

This definition is in addition to those expressed in art.

BACKGROUND

Typically, messaging conversations occur between one or more users via audio, video, and/or text streams Chatbots are integrated into interactive dialogs for various purposes such as personal messages, business communication, and the like. The capabilities and behavior of chatbots depend on the audience, for example, purpose of using the chatbots, languages used by the audience, interest of the audience, and the like. Basically, chatbots are configured to recognize the features of a received message, and respond to a message in a manner that depends on the recognized features of the received messages. In conventional chatbot systems, users recognize message features manually, and respond to the messages appropriately, which can be time consuming, thereby leading to slower response rates. In a case, where a message includes new/emerging topic of conversation which is not commonly known, the system requires significant resources to accommodate message features relating to such message. Further, in conventional chatbot systems, the personality, interest of a user, emotions of a user, and relationships between users, are not known to the system during the interaction or exchange of messages. Therefore, these systems are not able to respond with relevant replies and only provide robotic responses.

For instance, generally a virtual character appears robotic or computerised to a user, if a chatbot does not understand the interrogations of the user in either spoken or in written natural language, or if the chatbot does not reply with a meaningful response.

Furthermore, to provide computer-generated responses, the conventional chatbot systems such as ALICE chatbot, control virtual characters on a network based on keyword and pattern matching. As a result, the conventional chatbot systems lack the ability to interpret user inputs and interrogations as commands or requirements for actions.

Therefore, there is a need to provide a computer implemented system for automatically generating messages that limits the aforementioned drawbacks by providing automated interactions between a user and a set of recipients.

Objects

Some of the objects of the present disclosure, which at least one embodiment herein satisfies, are as follows:

An object of the present disclosure is to provide a computer implemented system for automatically generating messages, for user interaction.

Another object of the present disclosure is to provide a computer implemented system for automatically generating messages that automatically sends and receives messages to and from a set of recipients.

Yet another object of the present disclosure is to provide a computer implemented system for automatically generating messages that automatically assumes an identity of a recipient and his/her interest by identifying his/her activities on a network.

Another object of the present disclosure is to provide a computer implemented system for automatically generating messages that is simple and easy to operate.

Other objects and advantages of the present disclosure will be more apparent from the following description, which is not intended to limit the scope of the present disclosure.

SUMMARY

The present disclosure envisages a computer implemented system for automatically generating messages. The system includes a repository, a parser, an analyzer, a searching module, and a message generator. The repository is configured to store information related to chat sessions corresponding to a set of recipients, the information including contents of chats, historical timestamp information, personal information corresponding to each of the recipients, and relationship details of each recipient with a user. The parser is configured to cooperate with the repository to receive the stored information. The parser is further configured to parse information to generate parsed data including verbs, nouns and common phrases. The analyzer is configured to cooperate with the repository to receive the stored information. The analyzer is further configured to analyze the stored information to extract behavioral data of the user. The searching module is configured to cooperate with the parser to receive the parsed data. The searching module is further configured to search and extract relevant data from the web based on the parsed data. The message generator is configured to cooperate with the analyzer and the searching module to receive the extracted behavioral data and the extracted relevant data, respectively and generate messages corresponding to each recipient. The parser, the analyzer, the searching module, and the message generator are configured to be implemented using one or more processor(s).

In an embodiment, the message generator includes a lexical analyzer configured to generate the messages as natural language inputs using an artificial neural network.

In an embodiment, the system includes a scheduler which is configured to identify frequency and time based on the stored historical timestamp information and schedules a chat session for at least one recipient. The scheduler is implemented using one or more processor(s).

In an embodiment, the scheduler further configured to perform backup of the contents of the chat session, send messages in offline and online mode, and refreshes phrases which are used in the chat session, periodically.

In an embodiment, the system cooperating in a user device associated with the user.

In an embodiment, the system includes a segregator, which is configured to segregate data based on the stored information and emotions used in the chat sessions. The segregator is implemented using one or more processor(s).

In an embodiment, the system includes a session manager, which is configured to identify duplication of at least one chat session, if one or more copies are found corresponding to at least one recipient, the session manager further configured to delete the duplicated chat session. The session manager is implemented using one or more processor(s).

In an embodiment, the system includes a priority generation module configured to generate a priority for the at least one recipient based on the stored information. The priority generation module is implemented using one or more processor(s).

The present disclosure also envisages a computer implemented method for automatically generating messages comprising the following steps:

A computer implemented method for automatically generating a response, the method comprising:
  storing, in a repository, information related to chat sessions corresponding to a set of recipients, the information including contents of chats, historical timestamp information, personal information corresponding to each of the recipients, and relationship details of each recipient with a user;
  parsing, by a parser, information to generate parsed data including verbs, nouns and common phrases;
  analysing, by an analyzer, the stored information to extract behavioral data of the user;
  searching, by a searching module, search and extract relevant data from the web based on the parsed data; and
  generating, by a message generator, messages corresponding to each recipient.

BRIEF DESCRIPTION OF ACCOMPANYING DRAWING

A computer implemented system and method for automatically generating messages, of the present disclosure will now be described with the help of the accompanying drawing, in which.

LIST OF REFERENCE NUMERALS

| | |
|---|---|
| 100 | System |
| 102 | Repository |
| 104 | Parser |
| 106 | Analyzer |
| 108 | Searching Module |
| 110 | Message Generator |
| 110a | Lexical Analyzer |
| 112 | Segregator |
| 114 | Scheduler |
| 116 | Session Manager |
| 118 | Priority Generation Module |

DETAILED DESCRIPTION

A computer implemented system for automatically generating messages of the present disclosure is described with reference to FIG. 1 of the accompanying drawing.

Figure 1:
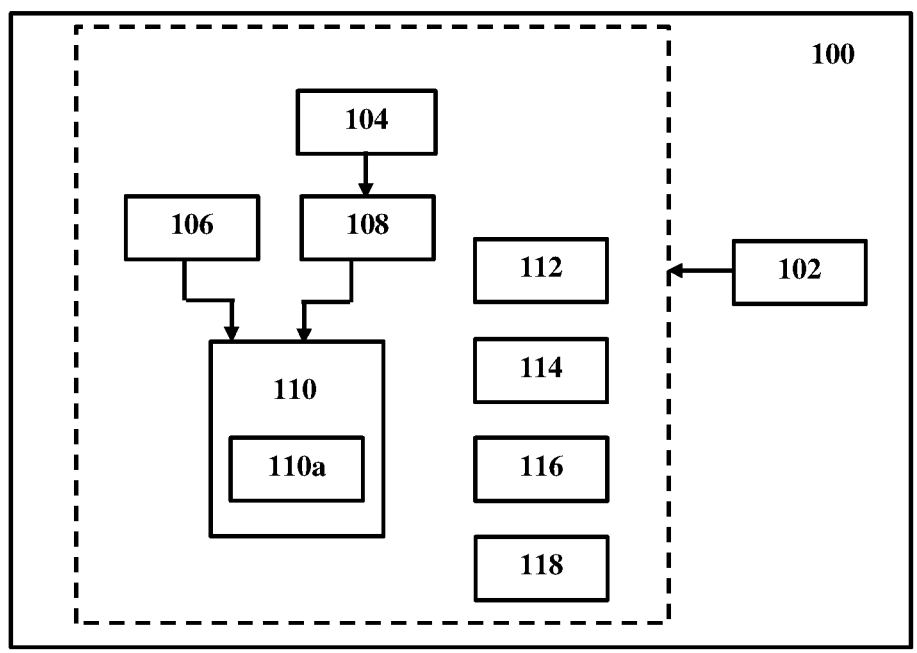
FIG. 1 illustrates a schematic block diagram of a computer implemented system for automatically generating messages, according to an embodiment of the present disclosure.

FIG. 1 illustrates a block diagram of the computer implemented system for automatically generating messages (hereinafter referred as "system') (100), in accordance with an embodiment of the present disclosure.

The system (100) includes a repository (102), a parser (104), an analyzer (106), a searching module (108), and a message generator (110). In an embodiment, the system (100) is cooperating in a user device associated with a user. In one embodiment, the user device may be a computer, laptop, mobile, wireless or cellular phone, PDA, tablet, and the like. The user device presents an interactive dialog on a display (not shown in figure). In another embodiment, the user device displays messages, which includes interactive dialogs with recipients in the form of texts, videos, pictures, greetings, emotions, quotations, avatars, and the like.

The repository (102) is configured to store information related to chat sessions corresponding to a set of recipients. The information includes contents of chats, historical timestamp information, personal information corresponding to each of the recipients, and relationship details of each recipient with a user. In an embodiment, the personal information of the each of the recipients includes, but is not limited to, name, gender, age, language, and the like. The repository (102) further configured to store certain features corresponding to emotional bonding between the user and the recipients.

In an embodiment, the repository (102) includes a plurality of folders, wherein each folder is associated to a user (hereinafter referred as "owner") and includes separate entity relationship details of the recipients with whom the user (owner) has a chat session. For example, if A is an owner, and B, C, and D are the family members of A, and X, Y, and Z are friends, then the repository (102) stores the chat sessions of B, C, and D in one folder, and the chat sessions X, Y, and Z in another folder. Each folder records a chat session of the recipient and catalogues or annotates the chats according to the user's categorization (friends, family, business, and the like). In one embodiment, at least one folder is assigned to one recipient. In another embodiment, a folder can have sub-folders depending on the emotional bonding between the owner and the recipients. For example, data related to close family members may be stored in a separate sub-folder than data related to distant relatives.

The parser (104) is configured to cooperate with the repository (102) to receive the stored information. The parser (104) is further configured to parse information to generate parsed data including verbs, nouns, and common phrases.

The analyzer (106) is configured to cooperate with the repository (102) to receive the stored information. The analyzer (106) is further configured to analyze the stored information to extract behavioral data of the user.

In an embodiment, the analyzer (106) is configured to analyze the behavioral data of the user by extracting social networking feed to extract activities of the user on the network, including activities like posting comments on live feed of the social media, messaging, discussions, likes/dislikes, and the like, in relation to the other recipients. The social media includes, but is not limited to, Facebook, Facebook Messenger, WhatsApp, Twitter, LinkedIn, Instagram, Spark, Google Chats, Hike Messenger, IMO Chats, SMS, Gab, Google+, Pinterest, Reddit, Snapchat, Tumblr, Viber, WeChat, Weibo, and the like. In an embodiment, the activities of the user are extracted from the social media, including blogs, posts, Rich Site Summary (RSS) feeds, micro blogging services, social networking services, voice recognition systems, Artificial Intelligence (AI) systems, Instant Message (IM) systems, Short Message Service (SMS) systems, and the like.

In an exemplary embodiment, if A is a user device, and B is a recipient, the analyzer (106) analyzes B's data stored in B's folder in the repository (102), along with the social media activities extracted by the analyzer (106), previous chat sessions with A, details related to relationship with A, language details, and the like. Based on the analyzed data, the system (100) automatically sends a message response to B, on behalf of A, in the language which B prefers.

The searching module (108) is configured to cooperate with the parser (104) to receive the parsed data. The searching module (108) is further configured to search and extract relevant data from a web based on the parsed data. In an embodiment, the searching module (108) is further configured to extract quotations, wishes, images, videos, and the like, from one or more websites via a network (not shown in figure).

The message generator (110) is configured to cooperate with the analyzer (106) and the analyzer (106) and the searching module (108) to receive the extracted behavioral data the extracted relevant data, respectively and generate messages with respect to each recipient. The message generator (110) is configured to generate messages as natural language inputs, using an artificial neural network (ANN). The message generator (110) performs the semantic and syntactic analysis of the chat session.

In an embodiment, the message generator (110) includes a lexical analyzer (110a). The lexical analyzer (110a) is configured to generate messages as natural language inputs using the artificial neural network.

A pseudo-code depicting the functionality of the message generator (110) is as follows:

1. Sending a message from an owner "A" to a user "B", who have a chat session previously;
2. Compares the conversations of A and B. Checking whether the conversation is same or not.
   if (match=yes)
   {
   then, process the chat session;
   else
   {
     if (select==chat_session2);
     { else if (match=yes)
   {
   then, process the chat session;
   }
   }
   }
   }
3. Applying fuzzy logic for selecting at least one chat session for processing.
   while(1)
   {
   get_chatbot _inputs( );
   fuzzification( );
   rule_evaluation( );
   defuzzification( );
   put_chatbot _outputs( );
   }

In an embodiment, the repository (102), the parser (104), the analyzer (106), the searching module (108), and the message generator (110) are implemented using one or more processor(s). In an embodiment, the one or more processor(s) may be implemented as one or more microprocessors, microcomputers, microcontrollers, digital signal processors, central processing units, state machines, logic circuitries, and/or any devices that manipulate signals based on operational instructions. Among other capabilities, the one or more processor(s) are configured to fetch and execute the set of predetermined rules to control modules/units of the system (100).

In one embodiment, the system (100) includes a memory (not shown in figure) that is configured to store a set of predetermined rules related to the chat session. In an embodiment, the memory may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes, and/or a cloud based storage (cloud storage). In another embodiment, the rules include rules to start/stop a session, rules to generate automated messages, rules to allow content extraction, and the like.

In an embodiment, the system (100) also analyzes an event based on the date and time, and the stored quotations, wishes, images, videos, and the like from the repository (102), and sends the quotations and/or wishes and/or images and/or videos, and the like, to the recipient based on the event and his relationship with the owner. For this, the system (100) also checks stored chat history, to confirm whether same posts/images/videos/quotations etc. have not already been sent to the live user. If they are not previously sent to the other user, then the system (100) sends the posts for specific events based on the other user's personal information. In an exemplary embodiment, if A wants to send birthday wishes to B, the system (100) automatically fetches birthday quotation(s) from the website, analyzes the relationship, checks history of the previous chat history, and if the quotation(s) is not sent previously, and is unique in the chat history of A and B, then automatically sends the quotation to B on behalf of A.

In an embodiment, when the user is alive, the system (100) facilitates live session of the owner, wherein the owner sends messages manually. If the owner has died, or is not able to send messages due to certain circumstances, the system (100) automatically facilitates a bot session.

In one embodiment, the system further includes a segregator (112), a scheduler (114), and a session manager (116). The segregator (112), the scheduler (114), and the session manager (116) are implemented using one or more processor(s).

The segregator (112) is configured to segregate the data based on the stored information of and emotions used in the chat sessions. In an embodiment, the emotions include anger, annoyed, busy, cheeky, cheerful, confusion, ecstatic, excited, flirty, frustrated, gloomy, hunger, lost, love, nervous, playful, sadness, scared, sick, and the like.

The scheduler (114) is configured to identify frequency and time based on the stored historical timestamp information and schedules a chat session for at least one recipient. In an embodiment, the scheduler (114) performs backup of the contents of the chat session, send messages in offline and online mode, and refreshes the phrases, which are used in the chat session, periodically.

In one embodiment, the scheduler (114) includes a real-time clock. The real-time clock keeps track of the time, day, month, and week. The real-time clock is a clock selected from a group of a computer clock, personal computer clock, servers, embedded systems, which is in the form of an integrated circuit that keeps track of the time, day, month, and week. The scheduler (114) facilitates reminders based on calendar's stored data, for example, birthdays, anniversaries, and/or any other special days stored in a calendar on a user device. In an exemplary embodiment, the scheduler (114) automatically assumes an identity of the live user and fetches the data from the calendar, for example his/her birth date, and in the absence of the owner, sends the birthday wishes to the user in the form of greetings, quotations, and the like.

In one embodiment, the scheduler (114) identifies how frequently the user/owner sends messages to the recipient, or at what time he/she prefers to send messages, and accordingly sends an automated message to the recipient. For example, if "A" user is used to sending good morning wishes to "B" at 7.45 AM daily, the scheduler (114) identifies the message time and frequency of such messages being sent. This feature can be enabled or disabled based on the user/owner.

The session manager (116) is configured to identify duplication of the chat session, if one or more copies are found corresponding to the recipient, the session manager (116) configured to delete the duplicated chat session. In an embodiment, if the session manager (116) finds duplication of the chat session, the session manager (116) permanently deletes the duplicated chat session.

In one embodiment, the session manager (116) manages two types of sessions, i.e. a bot session and a live session. In the bot session, the session manager (116) automatically sends messages to the recipient without the owner's permission. In the recipient, the owner himself, either sends message manually, or checks whether the message to be sent in the bot session is correct or not. If the owner wants to add more or alter the message, then the session manager (116) takes input from the owner and edits the previously sent message held in the bot session, or intervenes in the bot session or the live session. In another embodiment, the session manager (116) provides color indication to help identification of active and offline the recipients.

In another embodiment, the session manager (116) manages the chat sessions, by sending automatic messages or by replying on behalf of the owner to the other user or live user, unless the owner himself decides to not send messages by making appropriate settings, or if the owner blocks the recipient.

In an embodiment, the session manager (116) manages multiple profiles simultaneously, and allows addition, deletion, searching, updating of the chat session. Further, the session manager (116) manages functionalities like add, delete, update language, and translations, which are specific to a specific chat session, and selects and updates default activities and display messages. Additionally, the session manager (116) performs synchronization of a conversation data structure, and/or a dictionary with the repository (102), and allows sharing input messages from the chat session.

In an embodiment, the behavior of the system (100) is defined by user-generated knowledge in the form of a conversation data structure, a dictionary, and/or social media activities of a user. A code depicting the functionality of the system (100) is as follows:

```
vstring find_match(std::string input)
{
    vstring result;
    for(int i = 0; i < nKnowledgeBaseSize; ++i)
    {
        if(std::string(KnowledgeBase[i].input) == input)
        {
            copy(KnowledgeBase[i].responses, result);
            return result;
        }
    }
    return result;
}
void copy(char *array[i], vstring &v)
{
    for(int i = 0; i < MAX_RESPONSE; ++i)
    {
        v.push_back(array[i]);
    }
}
```

Figure 2:
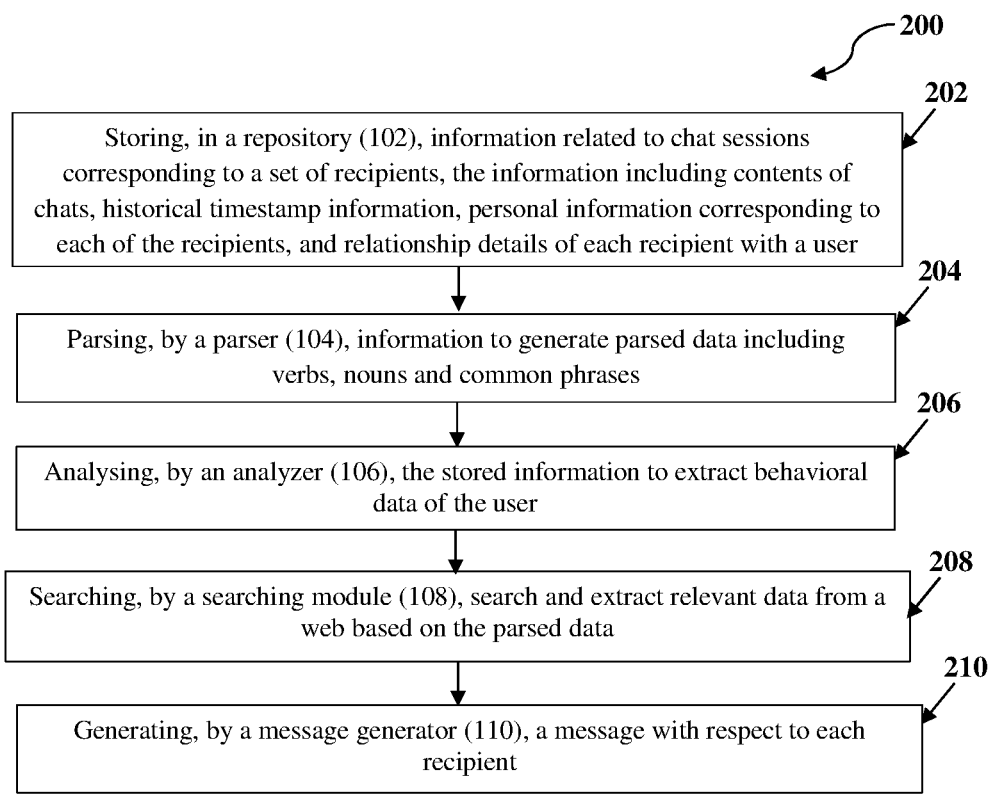
FIG. 2 illustrates a flow diagram showing steps performed by the computer implemented system for automatically generating messages of FIG. 1, in accordance with an embodiment of the present disclosure.

FIG. 2 illustrates a flow diagram showing steps performed by the computer implemented system for automatically generating messages, in accordance with an embodiment of the present disclosure. The method steps are as follows:

At block 202, storing, in a repository (102), information related to chat sessions corresponding to a set of recipients, the information including contents of chats, historical timestamp information, personal information corresponding to each of the recipients, and relationship details of each recipient with a user.

At block 204, parsing, by a parser (104), information to generate parsed data including verbs, nouns and common phrases.

At block 206, analysing, by an analyzer (106), the stored information to extract behavioral data of the user.

At block 208, searching, by a searching module (108), search and extract relevant data from the web based on the parsed data.

At block 210, generating, by a message generator (110), messages corresponding to each recipient.

Technical Advancements

The present disclosure described herein above has several technical advantages including, but not limited to, the realization of a computer implemented system and method for automatically generating messages, that:

automatically sends and receives messages to and from a recipient;

automatically assumes an identity of a user and his/her interest by identifying his/her activities on a network; and is simple and easy to operate.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system (100) for automatically generating messages, said system (100) comprising:
a repository (102) configured to store information related to chat sessions corresponding to a set of recipients, said information including contents of chats, historical timestamp information, personal information corresponding to each of the recipients, and relationship details of each recipient with a user;
a parser (104) configured to cooperate with said repository (102) to receive the stored information, said parser (104) further configured to parse information to generate parsed data including verbs, nouns and common phrases;
an analyzer (106) configured to cooperate with said repository (102) to receive the stored information, said analyzer (106) further configured to analyze the stored information to extract behavioral data of the user;
a searching module (108) configured to cooperate with the parser (104) to receive the parsed data, said searching module (108) further configured to search and extract relevant data from the web based on the parsed data;
a priority generation module (118) configured to generate a priority for said at least one recipient based on said stored information wherein said priority is generated before a message is generated; and
a message generator (110) configured to cooperate with the analyzer (106) and the searching module (108) to receive the extracted behavioral data and the extracted relevant data, respectively and generate said message corresponding to each of said recipient;
a session manager (116) configured to identify duplication of at least one chat session, if one or more copies are found corresponding to at least one recipient and delete the duplicated chat session, the session manager (116) further configured to manages types of sessions wherein:

a bot session automatically sends messages to the recipient without the owner's permission; and
a live session wherein the owner himself, either sends message manually, or checks whether the message to be sent in the bot session is correct or not,
the session manager (116) further configured to take input from the owner and edits the previously sent message held in the bot session, or intervenes in the bot session or the live session,
wherein said parser (104), said analyzer (106), said searching module (108), said message generator (110), said session manager (116), and said priority generation module (118) are configured to be implemented using one or more processor(s).

2. The system (100) as claimed in claim 1, said message generator (110) includes a lexical analyzer (110a) configured to generate the messages as natural language inputs using an artificial neural network.

3. The system (100) as claimed in claim 1, includes a scheduler (114) configured to identify frequency and time based on the stored historical timestamp information and schedule a chat session for at least one recipient, wherein said scheduler (114) is implemented using one or more processor(s).

4. The system (100) as claimed in claim 3, wherein said scheduler (114) further configured to perform backup of the contents of the chat session, send messages in offline and online mode, and refreshes phrases which are used in the chat session, periodically.

5. The system (100) as claimed in claim 1, wherein said system (100) cooperating in a user device associated with the user.

6. The system (100) as claimed in claim 1, includes a segregator (112) configured to segregate data based on the stored information and emotions used in the chat sessions, wherein said segregator (112) is implemented using one or more processor(s).

7. A computer implemented method (200) for automatically generating a response, said method (200) comprising:
storing, in a repository (102), information related to chat sessions corresponding to a set of recipients, said information including contents of chats, historical timestamp information, personal information corresponding to each of the recipients, and relationship details of each recipient with a user; receiving, by a parser (104), the stored information in cooperation with said repository (102); parsing, by the parser (104), information to generate parsed data including verbs,
nouns and common phrases; receiving, by an analyzer (106), the stored information in cooperation with said
repository (102); analyzing, by the analyzer (106), the stored information to extract behavioral data of the user; receiving, by a searching module (108), the parsed data in cooperation with the parser (104); searching and extracting, by the searching module (108), relevant data from the web based on the parsed data; generating, by a message generator (110), messages corresponding to each
recipient; identifying, by a session manager (116), duplication of at least one chat session, if one or more copies are found corresponding to at least one recipient and delete the duplicated chat session;
managing, by the session manager (116), types of sessions wherein a bot session automatically sends messages to the recipient without the owner's permission and a live session wherein the owner himself, either sends message manually, or checks whether the message to be sent in the bot session is correct or not;

taking, by the session manager (116), input from the owner and edits the previously sent message held in the bot session, or intervenes in the bot session or the live session; generating, by a priority generation module (118), a priority for said at least one recipient based on said stored information wherein said priority is generated before a message is generated; and receiving, by a message generator (110), the extracted behavioral data and the extracted relevant data; and generating, by thea message generator (110), messages corresponding to each wherein said parser (104), said analyzer (106), said searching module (108), said message generator (110), and said priority generation module (118) are configured to be implemented using one or more processors.

* * * * *